US012608975B2

(12) United States Patent
Liu et al.

(10) Patent No.: US 12,608,975 B2
(45) Date of Patent: Apr. 21, 2026

(54) MULTI-SCALE MODEL ENSEMBLE FOR CLASSIFICATION OF OBJECTS

(71) Applicant: Google LLC, Mountain View, CA (US)

(72) Inventors: Yaojie Liu, Mountain View, CA (US); Wen-Sheng Chu, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 616 days.

(21) Appl. No.: 18/150,426

(22) Filed: Jan. 5, 2023

(65) Prior Publication Data

US 2024/0233437 A1      Jul. 11, 2024

(51) Int. Cl.
*G06V 40/16*          (2022.01)
*G06V 10/26*          (2022.01)
*G06V 10/764*          (2022.01)

(52) U.S. Cl.
CPC ............ *G06V 40/172* (2022.01); *G06V 10/26* (2022.01); *G06V 10/764* (2022.01)

(58) Field of Classification Search
CPC .... G06V 40/172; G06V 10/26; G06V 10/764; G06V 10/82; G06V 40/161
See application file for complete search history.

(56) References Cited

U.S. PATENT DOCUMENTS

| | | | | |
|---|---|---|---|---|
| 10,706,301 | B2 * | 7/2020 | Noridomi | ................. G06T 7/74 |
| 11,443,553 | B1 * | 9/2022 | Liu | ...................... G06V 10/762 |
| 11,631,275 | B2 * | 4/2023 | Xiong | ........................ G06T 3/40 |
| | | | | 382/103 |
| 11,651,602 | B1 * | 5/2023 | Tschernezki | ......... G06V 10/803 |
| | | | | 382/157 |
| 11,783,612 | B1 * | 10/2023 | Kuo | ...................... G06V 40/103 |
| | | | | 382/100 |
| 12,079,936 | B2 * | 9/2024 | Yang | ........................ G06T 17/00 |
| 12,243,258 | B1 * | 3/2025 | Mathew | .................... G06T 7/50 |
| 12,272,003 | B2 * | 4/2025 | Kraus | ...................... G06F 3/012 |
| 12,367,703 | B2 * | 7/2025 | Verbeke | ............. G06V 40/161 |
| 2005/0147291 | A1 * | 7/2005 | Huang | ................. G06V 40/172 |
| | | | | 382/218 |
| 2015/0086108 | A1 * | 3/2015 | Craig | .................... G06V 40/164 |
| | | | | 382/154 |
| 2018/0196587 | A1 * | 7/2018 | Bialynicka-Birula | ........................ |
| | | | | G06V 20/41 |
| 2018/0357501 | A1 * | 12/2018 | Ma | ........................ G06V 10/764 |
| 2020/0193141 | A1 * | 6/2020 | Tan | ........................ G06V 20/64 |
| 2020/0410281 | A1 * | 12/2020 | Goel | ...................... G06N 3/084 |
| 2021/0071401 | A1 * | 3/2021 | Shen | ...................... G06F 18/214 |
| 2021/0319211 | A1 * | 10/2021 | Tong | .................... G06V 40/161 |
| 2021/0390789 | A1 * | 12/2021 | Liu | ...................... G06V 40/161 |
| 2021/0409645 | A1 * | 12/2021 | Xu | ............................ G06N 3/09 |
| 2022/0030157 | A1 * | 1/2022 | Waitz | .................... G03B 17/18 |
| 2022/0157081 | A1 * | 5/2022 | Pan | ........................ G06N 3/08 |
| 2022/0207807 | A1 * | 6/2022 | Gebre | ................. G06V 10/776 |
| 2022/0277558 | A1 * | 9/2022 | Li | ........................ G06V 20/597 |
| 2023/0237835 | A1 * | 7/2023 | Fu | ........................ G06V 40/171 |
| | | | | 382/103 |
| 2023/0419674 | A1 * | 12/2023 | Sommer | ............. G06V 10/774 |

(Continued)

*Primary Examiner* — Wesley J Tucker

(74) *Attorney, Agent, or Firm* — DORITY & MANNING P.A.

(57) ABSTRACT

Provided is a multi-scale model ensemble for detection of objects in images. The model ensemble can be applied, for example, in the context of performing object identification activities, such as positively identifying desired objects in image data or video data using a variety of different crop levels.

20 Claims, 5 Drawing Sheets

(56)     References Cited

U.S. PATENT DOCUMENTS

| 2024/0153254 A1* | 5/2024 | Rowe | .................... G06F 18/214 |
| 2024/0193903 A1* | 6/2024 | Kligys | ................... G06V 10/25 |
| 2024/0249500 A1* | 7/2024 | Afrasiabi | ............. G06V 10/774 |
| 2025/0104470 A1* | 3/2025 | Garrido | ................ G06T 7/0002 |
| 2025/0124650 A1* | 4/2025 | Cao | ........................... G06T 5/50 |

* cited by examiner

MULTI-SCALE MODEL ENSEMBLE FOR CLASSIFICATION OF OBJECTS

FIELD

The present disclosure relates generally to image analysis. More particularly, the present disclosure relates to a multi-scale model ensemble for determining whether an image contains a particular object, especially for use cases involving the identification of the particular triggering further actions, such as notifying users of a particular object being detected, triggering automatic actions such as allowing access to a computing system, and the like.

BACKGROUND

More and more software applications are using image recognition technology, such as object identification, facial recognition, and other applications. In some instances, these image recognition software applications can be used to initiate further actions associated with the image recognition software application or another software application.

As one example, object detection technology may be used to notify a user when a person is at a front door of a building. For example, a camera mounted on a front door of the building can capture image data of a scene in front of the door. If a person is recognized as standing in the scene, an image recognition software application can be used to notify a user that a person is standing at the door.

However, use of image recognition technology can lead to improper identification of an object and, therefore, improper actions being taken in response to the mis-identification of the object currently in an image. For example, if a cat or other animal is present at the front door of a building, a user may be improperly notified that a person is at the door.

Therefore, there is a need for image recognition technology to be able to identify particular, desired objects and take appropriate actions based on the proper particular object being identified.

Aspects and advantages of embodiments of the present disclosure will be set forth in part in the following description, or can be learned from the description, or can be learned through practice of the embodiments.

One example aspect of the present disclosure is directed to a method for detecting an object in an image. The method can include receiving, by at least one electronic processor, an input image and generating, by the at least one electronic processor, an image set from the input image, wherein the image set comprises a plurality of images that depict different portions of the input image. The method can further include respectively processing, by the at least one electronic processor, the plurality of images with a plurality of machine-learned models to generate a plurality of outputs respectively from the plurality of machine-learned models, determining, by the at least one electronic processor, an object detection prediction for the input image based at least in part on the plurality of outputs respectively from the plurality of machine-learned models; and performing, by the at least one electronic processor, at least one action based at least in part on the object detection prediction for the input image.

Another example aspect of the present disclosure is directed to a computer system for detecting an object. The computer system can include at least one electronic processor and one or more non-transitory computer-readable media that collectively store a multi-scale model ensemble comprising a plurality of machine-learned models and instructions that, when executed by the at least one electronic processor, cause the computer system to perform operations. The operations can include receiving, by at least one electronic processor, an input image and generating, by the at least one electronic processor, an image set from the input image, wherein the image set comprises a plurality of images that depict different portions of the input image. The operations can also include respectively processing, by the at least one electronic processor, the plurality of images with the plurality of machine-learned models to generate a plurality of outputs respectively from the plurality of machine-learned models, determining, by the at least one electronic processor, an object detection prediction for the input image based at least in part on the plurality of outputs respectively from the plurality of machine-learned models, and performing, by the at least one electronic processor, at least one action based at least in part on the object detection prediction for the input image.

Another example aspect of the present disclosure is directed to user device for detecting an object. The user device can include at least one electronic processor and one or more non-transitory computer-readable media that collectively store a multi-scale model ensemble comprising a plurality of machine-learned models and instructions that, when executed by the at least one electronic processor, cause the computer system to perform operations. The operations can include receiving, by at least one electronic processor, an input image and generating, by the at least one electronic processor, an image set from the input image, wherein the image set comprises a plurality of images that depict different portions of the input image. The operations can further include respectively processing, by the at least one electronic processor, the plurality of images with the plurality of machine-learned models to generate a plurality of outputs respectively from the plurality of machine-learned models, determining, by the at least one electronic processor, an object detection prediction for the input image based at least in part on the plurality of outputs respectively from the plurality of machine-learned models; and performing, by the at least one electronic processor, at least one action based at least in part on the object detection prediction for the input image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
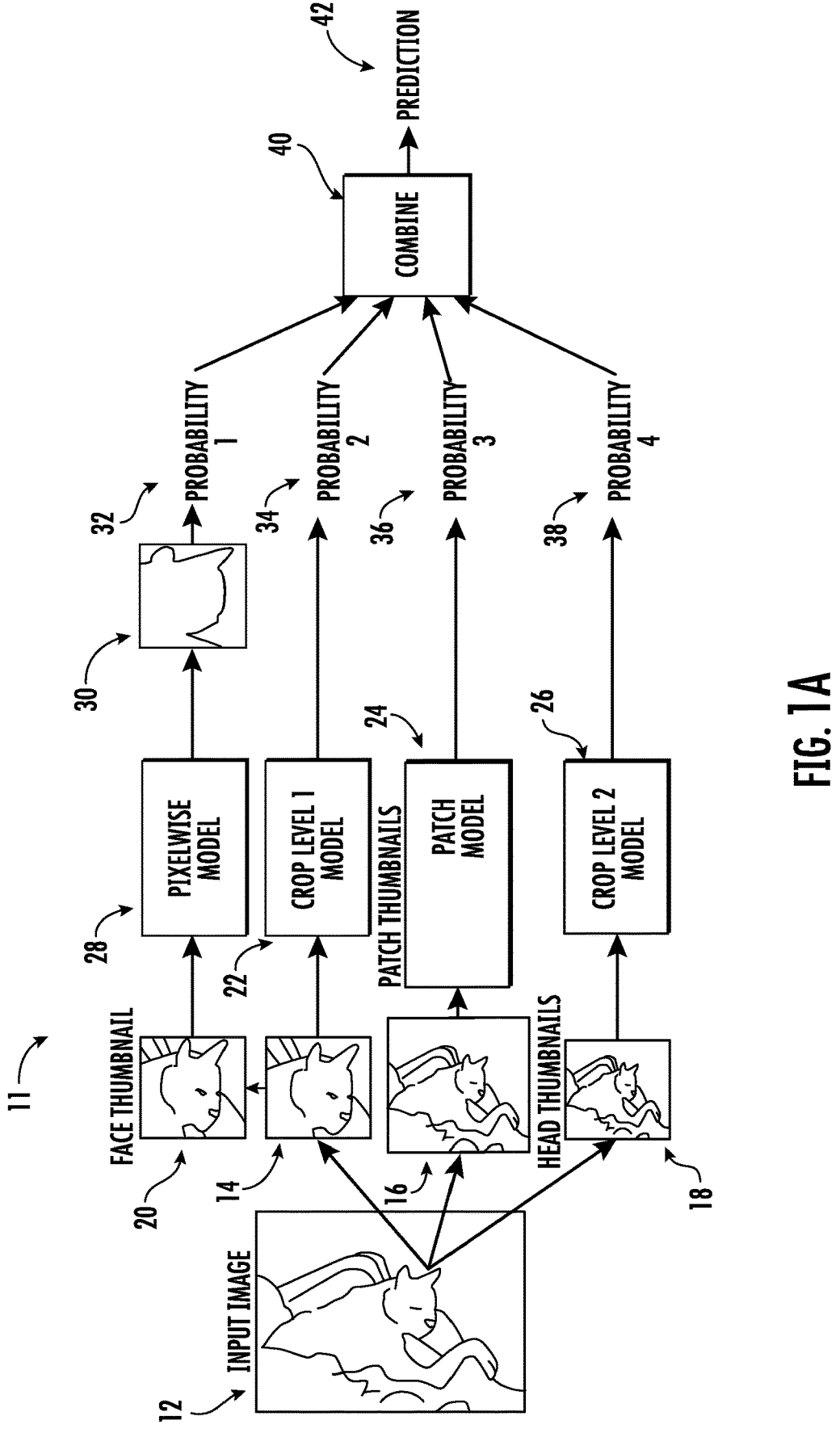
FIG. 1A depicts a block diagram of an example multi-scale model ensemble for detection of objects according to example embodiments of the present disclosure.

Reference numerals that are repeated across plural figures are intended to identify the same features in various implementations.

DETAILED DESCRIPTION

Overview

Generally, the present disclosure is directed to a multi-scale model ensemble for detection of objects. The model ensemble can be applied, for example, in the context of performing object detection of particular objects in images.

In particular, one aspect of the present disclosure is directed to a monocular RGB-camera-based system to classify an input image that depicts a scene that can include one or more objects. The detection system can employ a multi-scale model ensemble to distinguish whether a particular object that is desired to be detected (e.g., a person at a front door, a face in a photo, a particular brand of item on a shopping shelf, and the like) is present in an image.

More particularly, existing approaches focus on modeling textural information from low-level raw pixels. Such texture-based models, however, typically focus on one layer of crops and tend to be limited to a certain resolution and a fixed scale on the region. However, modeling textural information is known to be sensitive to sensor characteristics (e.g., exposure, white balance, focus range) and their imaging quality (e.g., motion blur, camera noise, environmental lighting changes). As a result, conventional texture-based models cannot work reliably on commercial products, which need to tackle use cases under a wide variety of camera and environment changes.

According to aspects of the present disclosure, a multi-scale model ensemble can include a plurality of different machine-learned models that analyze different aspects of the input image to collectively generate an object detection prediction for the input image. The proposed techniques can therefore leverage the fact that different spatial scales of the input imagery expose distinct details of textural information to emphasize cues at different resolution or scale. For example, the finest pixel-level scale contains high-frequency, subtle patterns that can distinguish particular objects from other objects; while a wider scale helps pick up contextual cues in the background. To leverage this observation, this ensemble can include a plurality of models that analyze different portions of the input image and/or use different forms of analysis on the portion(s) of the input image.

As one example, the model ensemble can include models that specifically analyze particular regions of the input image, smaller patches of regions of the input image, and/or other different portions of the input image. By employing multiple models that analyze different (potentially overlapping) portions of the input image (e.g., at different image scales), the ensemble can perform a more robust analysis of input image. For example, the model that analyzes patches can learn to evaluate high-frequency texture details; while the model that analyzes imagery of particular regions can evaluate a wider context, including detection of cues from background content.

As another example, the model ensemble can include models that analyze portion(s) of the input image at differing granularities. For example, some model(s) may perform a pixel-wise analysis that evaluates each individual pixel for cues; while other model(s) may perform an image-wide analysis that concurrently evaluates an entirety of the input (e.g., a portion of the input image) for object detection.

As yet another example, the ensemble may include models that evaluate inputs that have been subjected to different pre-processing and/or feature extraction techniques. For example, certain model(s) may analyze portion(s) of the raw input image; while other model(s) may analyze portion(s) of the input image that have been subjected to various pre-processing or feature extraction techniques such as brightness normalization, contrast normalization, edge-detection, etc. For example, model(s) that analyze the raw imagery may focus more on information encoded within the texture; while model(s) that analyze normalized imagery may focus more on geometric information.

One particular example system can include four models at different scales. Certain models can take a tight crop (e.g., a crop only scaled, e.g., to 224×224 pixels) as input. Other models can take a larger region crop (e.g., a crop of a portion of the image and the surrounding area scaled, e.g., to 224×224 pixels) as input, aiming to capture more background as context information. Thus, in some implementations, these models can take an image as input and can be designed to pick up contextual cues in the background (e.g., shape of a cat instead of a shape of a human and relative height differences between the two). In contrast, other models can take a tighter crop (e.g., a partial shape of a cat) as input and can analyze its textural differences to determine if the particular object to be identified is present.

A patch model can take patches extracted from a high-resolution region (e.g., a crop only scaled, e.g., to 448×448 pixels and then split into, e.g., 5 patches of size 224×224 pixels), expecting to focus on detailed texture patterns. Thus, in some implementations, the patch model can take local patches extracted from a higher-resolution face crop and can focus on recognizing high-frequency signals that tell the subtle differences between types of objects.

A pixel-wise model can take a tight crop (e.g., the 224×224 crop of the face, optionally additionally pre-processed) as input and can produce a pixel-wise estimation on the likelihood that the particular object is present. Other example models can be used as well, such as eye models, lower crop models, and/or others. Thus, in some implementations, the pixel-wise model can also take a tight crop as input. Instead of generating a single prediction image, the pixel-wise model can perform per-pixel prediction For example, a desired object to detect can receive non-zero predictions; while a non-desired object to detect can obtain zero-valued predictions.

By implementing the present invention, various software applications that rely on image input for performing other actions or features (or other software applications where image integrity is vital) can positively identify objects at a greater level of detail than existing systems, reducing the number of false positives and associated incorrect actions being taken in response to detecting an object in an image.

The systems described herein can be implemented by a computing system that includes one or more computing devices. Computing devices include server computing devices, user device(s) (e.g., smartphone, tablet, laptop, etc.), home security systems, embedded devices, and/or other devices. Thus, the proposed ensembles can be implemented "on-device" or can be implemented as a cloud service.

With reference now to the Figures, example embodiments of the present disclosure will be discussed in further detail.

Example Model Ensembles

FIG. 1A depicts a block diagram of an example multi-scale model ensemble 11 for detection an object according to example embodiments of the present disclosure. The model ensemble 11 includes a pixel-wise model 28, a crop level 1 22, a patch model 24, and a crop level 2 model 26. Each of the pixel-wise model 28, a crop level 1 model 22, a patch model 24, and a crop level 2 model 26 can be machine-learned models such as neural networks (e.g., convolutional neural networks). The ensemble 11 can be implemented by a computing system (e.g., a server, a user device (e.g., smartphone, tablet, laptop, gaming console, etc.), home security system, and/or other devices).

The ensemble 11 can be implemented to generate an object detection prediction 42 for an input image 12. For example, the object detection prediction 42 can predict or infer whether the input image 12 depicts a particular object to be identified. In some implementations, the object detection prediction 42 can be expressed as a probability value (e.g., ranging from 0 to 1). For example, an object detection prediction 42 of value 1 can indicate a 100% predicted probability that the input image 12 depicts the desired object; while an object detection prediction 42 of value 0 can indicate a 0% predicted probability that the input image 12 depicts the desired object (or conversely a 100% predicted probability that the input image 12 does not depict the desired object). Further discussions herein will follow this convention. However, the alternative arrangement is possible as well (i.e., reversing the relationship between zero and one such that a score of one indicates 100% probability the object is present).

According to an aspect of the present disclosure, the computing system can generate an image set from the input image 12. The image set can include a plurality of images that depict different portions of the input image. As examples, to generate the image set, the computing system can perform one or more cropping operations on the input image 12 to generate a plurality of cropped images that depict different portions of the input image and then perform one or more scaling operations on the plurality of cropped images to generate the plurality of images of the image set. For example, the cropping operations can be performed based on object recognition bounding boxes generated by an objection recognition process or model. For example, a bounding box can be determined for different areas of the image, respectively.

As illustrated in the example of FIG. 1A, the input image 12 can be cropped and scaled to generate a second image 18 that depicts a second scaled and cropped portion of the input image 12 and a background area that surrounds the second scaled and cropped portion. For example, the second image 18 can be a crop of the second scaled and cropped portion and surrounding area of the input image 12 scaled, e.g., to 224×224 pixels. Likewise, the input image 12 can be cropped and scaled to generate a first image 14 that has been cropped to depict only a particular portion of the input image 12. For example, the first image 14 can be a crop of the particular portion only scaled, e.g., to 224×224 pixels.

In addition, the input image 12 can be cropped and scaled to generate an additional image 16 that has been cropped to depict only the particular portion of the desired object. For example, the additional image 16 can be a crop of the particular portion only scaled, e.g., to 448×448 pixels. A number of patches can be generated from the additional image 16. The patches can be overlapping or non-overlapping. As an example, as illustrated in FIG. 1A, 5 patches of size 224×224 pixels each can be generated. However, any number and size of patches can be generated.

Finally, a normalized image 20 can be generated from the first image 14. As one example, the normalized image 20 can be generated by performing brightness normalization and contrast normalization on the raw first image 14.

The images 14, 16, 18, and 20 can be respectively processed by the machine-learned models 22, 24, 26, and 28 to generate a plurality of outputs respectively from the plurality of machine-learned models 22, 24, 26, and 28. In particular, the machine-learned head model 26 can be configured to process the second image 18 to generate a second output 38 indicative of whether the input image 12 comprises a desired object at a second crop level; the machine-learned crop level 1 model 22 can be configured to process the first image 14 to generate a crop level 1 output 34 indicative of whether the input image 12 comprises the desired object at a first crop level; and the machine-learned patch model 24 can be configured to process the image patches to generate one or more patch outputs 36 indicative of whether the input image 12 comprises the desired object at various patches. As examples, in some implementations, the outputs 34, 36, and 38 from the models 22, 24, and 26 can be individual probabilities each indicating a probability that the input imagery 12 comprises the desired object. For example, each of the outputs 34, 36, and 38 can be a probability value in a range from 0 to 1, as described above.

Unlike the models 14, 16, and 18 which operate at an image or patch level, the pixel-wise model 28 can generate a pixel-wise prediction. Specifically, the pixel-wise model 28 can be configured to process the first image 20 to generate a grayscale image 30 that indicates a realism prediction on a pixel-wise basis. As one example, the grayscale image 30 can indicate zero values for pixels that are not indicative of the desired object to identify. Conversely, the grayscale image 30 can indicate positive values (e.g., ranging from greater than zero to one) for pixels that are indicative of the desired face to identify. For example, the positive values can inversely correlate to a depth of the object from the camera. In some implementations, the grayscale image 30 can be transformed into a probability output 32. As one example, an average of the pixel-wise values across the image 30 can be used as a single probability output 32.

The computing system can generate the object detection prediction 42 for the input image 12 based at least in part on the plurality of outputs 32, 34, 36, and 38 respectively from the plurality of machine-learned models 28, 22, 24, and 26. As one example, a set of combination logic 40 can be executed to combine the outputs 32, 34, 36, and 38 to generate the object detection prediction 42. As one example, the combination logic 40 can determine a weighted average of the probabilities 32, 34, 36, and 38 to use as the object detection prediction 42. For example, the weights in the weighted average can be manually determined or can be learned through a machine learning process.

In some embodiments, the desired object to detect can be a person, including a head and/or face. For example, the computing system may wish to identify a person waiting at a door (instead of identifying a person coming up to the door, placing an item on the ground, and leaving and/or a non-person being present at the door). The computing system can perform object detection for the person waiting at the door as the particular object to be identified by identifying a face and/or a head of the person at various crop levels (as described above) to detect that the person is waiting at the door instead of simply passing by or leaving an item in front of the door.

The computing system can perform at least one action based at least in part on the object detection prediction 42 for the input image 12. As one example, if the object detection prediction 42 is greater than a threshold value, an automatic action (such as transmitting a push notification to a mobile computing device indicating a person is present at a door and waiting instead of a person quickly dropping something off and leaving or a cat being present at the door) can be performed.

The machine-learned models 22, 24, 26, and 28 can be trained in a number of manners. As one example, the models 22, 24, and 26 can be trained using a supervised learning approach. Specifically, images having ground truth labels (e.g., known to be a desired object or undesired object and labeled as such) can be used to train each model independently of the other models. For example, a training image can be cropped and scaled to generate an image set. The appropriate image from the image set (e.g., crop level 1 vs. crop level 2 vs. patches) can be provided to the corresponding model and the model can make a prediction. A loss function can compare the prediction to the ground truth label. The loss function can be used (e.g., via backpropagation) to update the parameter values of the model.

The pixel-wise model 28 can be trained in a similar matter. For example, a ground truth grayscale image can be generated from a labelled image. For example, if an image does not contain the desired object to identify, then the ground truth grayscale image can be set to all zeros. However, if an image labelled as a real image, then the ground truth grayscale image can be generated as follows: pixels that correspond to background can be set to zero; while pixels that correspond to desired object be set to positive values that correspond to pseudo-depth as described herein. Then, the pixel-wise model 28 can be provided with the labelled input image to generate a predicted grayscale image. A loss function can compare the predicted grayscale image with the ground truth grayscale image for the labelled input image. The loss function can be used (e.g., via backpropagation) to update the parameter values of the model.

In some embodiments, the machine-learned models 22, 24, 26, and 28 can be configured to process an input image of a cat, which can be separated into crop level 1 (face) portions and crop level 2 (head) portions. These portions can then be processed as described above to provide a prediction of a facial identification of a user, for example.

Figure 1B:
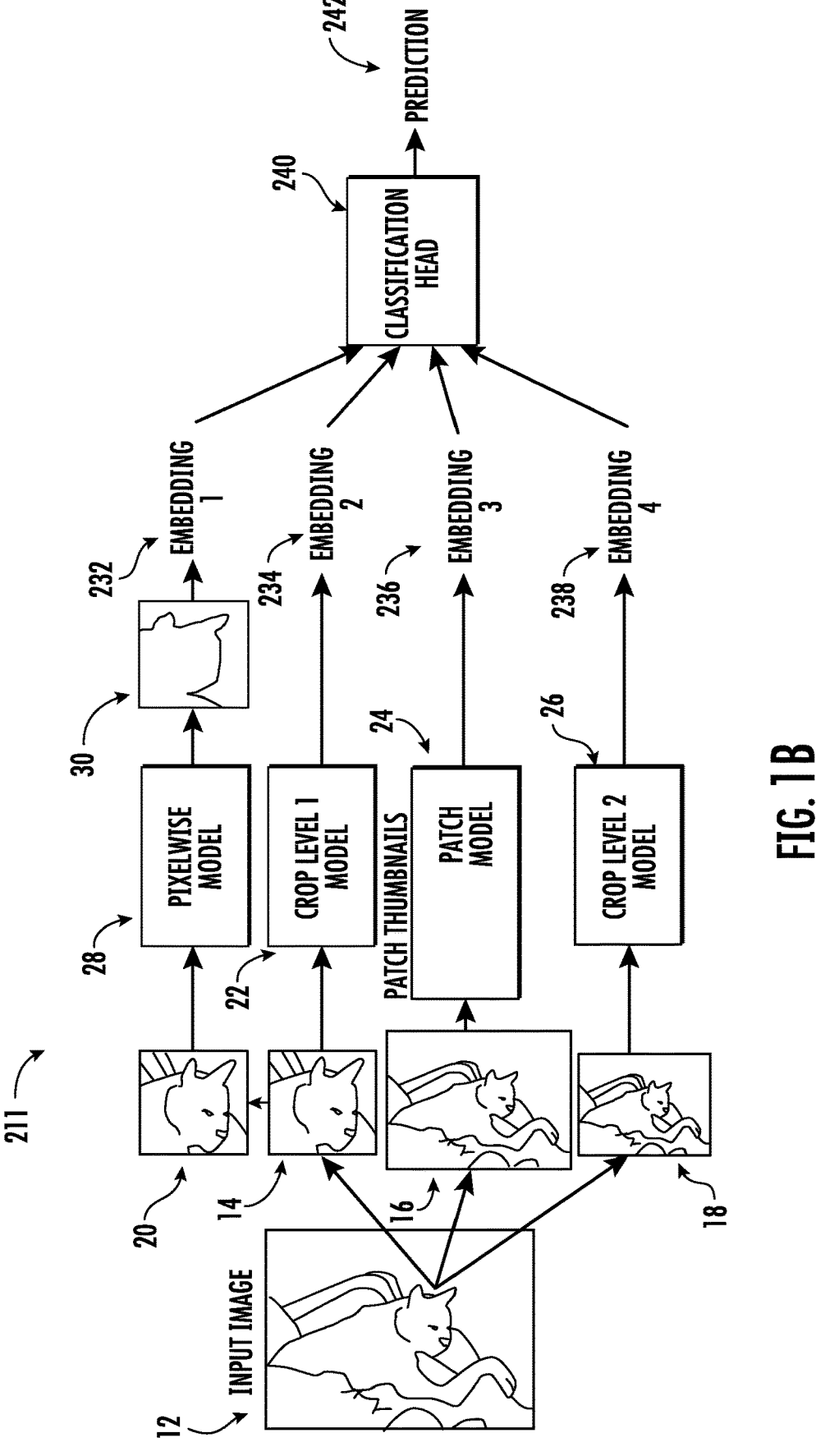
FIG. 1B depicts a block diagram of an example multi-scale model ensemble for detection of objects according to example embodiments of the present disclosure.

FIG. 1B depicts a block diagram of an example multi-scale model ensemble 211 for detection of an object according to example embodiments of the present disclosure. The multi-scale model ensemble 211 of FIG. 1B is highly similar to the ensemble 11 of FIG. 1A with the following exception:

In the ensemble 211 of FIG. 1B, the models 22, 24, and 26 are not configured to directly output a probability value. Instead, the models 22, 24, and 26 are configured to output respective embeddings 234, 236, and 238. The embeddings 234, 236, and 238 can each be a set of numerical values (e.g., as a vector) expressed in a latent variable or "embedding" space. Similarly, the grayscale image 30 can be used as an embedding or an embedding 232 can be generated from the grayscale image 30. For example, the embedding 232 can be the pixel values from the image 30 flattened into a vector, pooled, or otherwise transformed into an embedding 232.

Further, the ensemble 211 can include a classification head 240. The classification head can be a machine-learned model such as a neural network (e.g., feed-forward neural network), multi-layer perceptron, etc. The classification head 240 can collectively process the embeddings 232, 234, 236, and 238 to generate the object detection prediction 242.

Figure 2A:
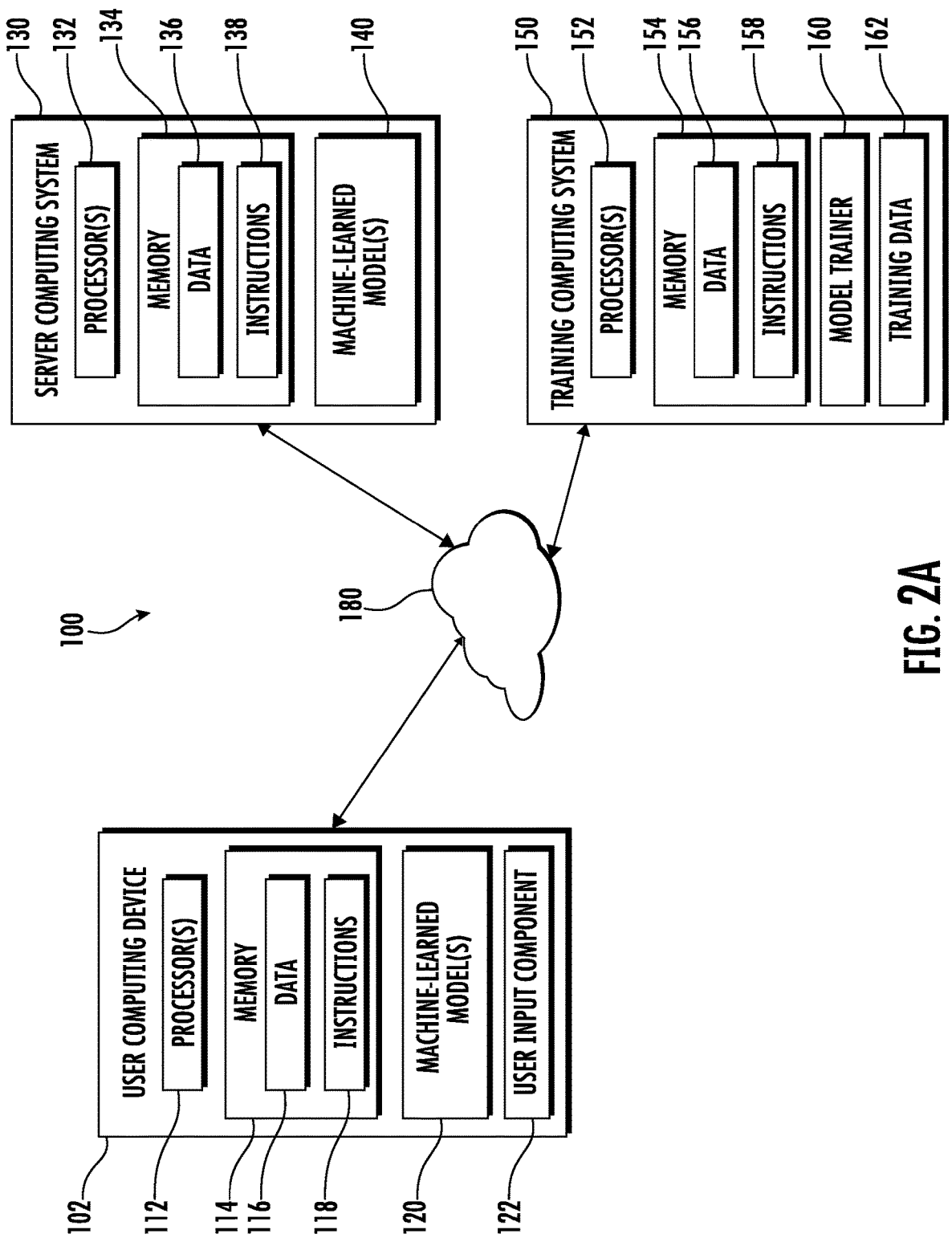
FIG. 2A depicts a block diagram of an example computing system that performs object detection according to example embodiments of the present disclosure.
Figure 2B:
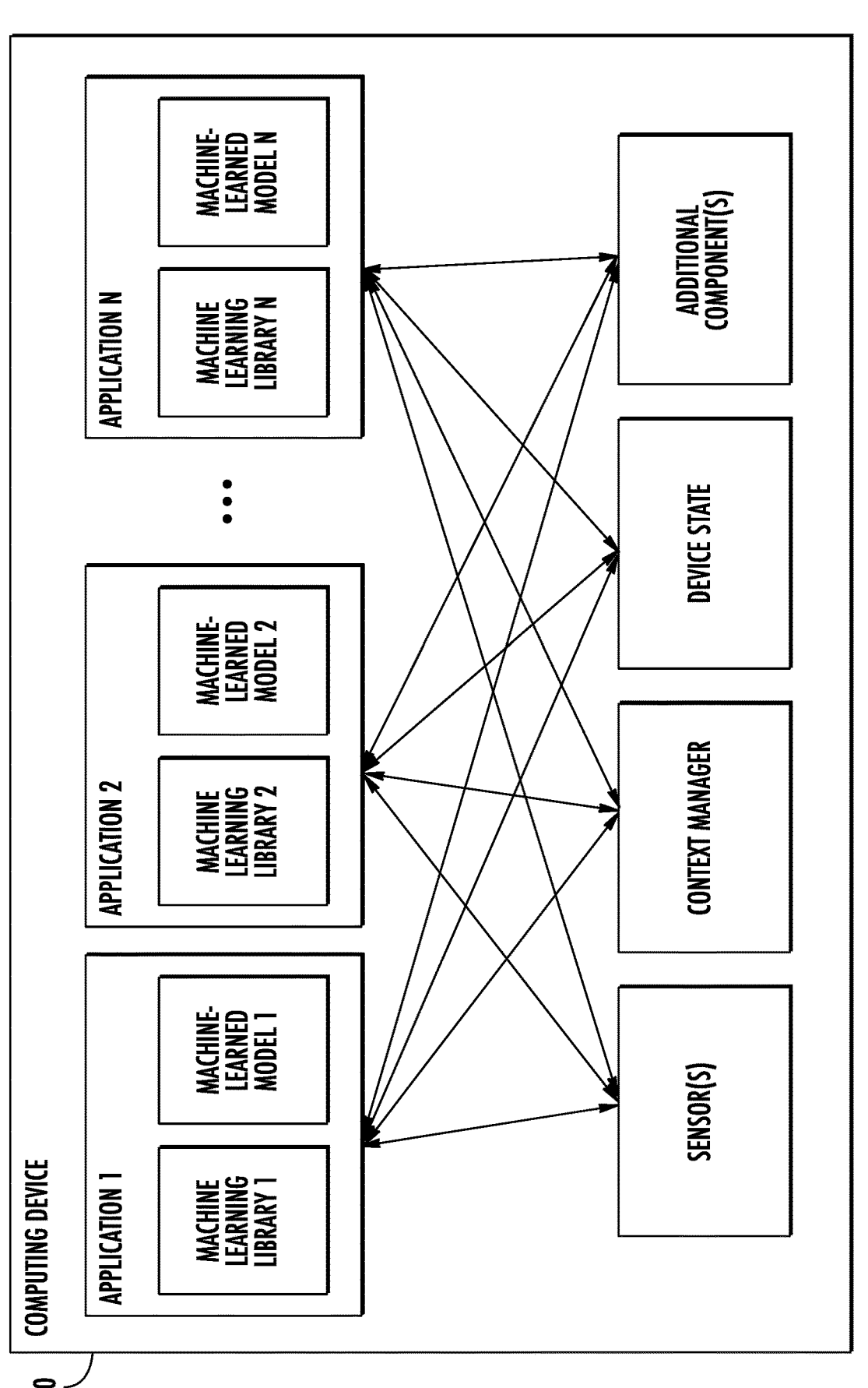
FIG. 2B depicts a block diagram of an example computing device that performs object identification according to example embodiments of the present disclosure.

In some implementations, in the ensemble 211 of FIG. 2B, some or all of the models 28, 22, 24, 26, and 240 can be jointly trained in an end-to-end fashion. For example, a labelled input image can be fed into the ensemble 211 as illustrated. The ensemble 211 can generate an object detection prediction. A loss function can compare the generated object detection prediction with the ground truth label for the labelled input image. The loss function can be used (e.g., via backpropagation) to update the parameter values of some or all of the models. Other loss functions can be used in addition (e.g., an ancillary loss to guide the generation of the grayscale image by the pixel-wise model 28).

Example Devices and Systems

FIG. 2A depicts a block diagram of an example computing system 100 that performs object detection according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more object detection models 120. For example, the object detection models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example object detection models 120 are discussed with reference to FIGS. 1A and 1B.

In some implementations, the one or more object detection models 120 can be received from the server computing system 130 over network 180, stored in the user computing device memory 114, and then used or otherwise implemented by the one or more processors 112. In some implementations, the user computing device 102 can implement multiple parallel instances of a single object identification model 120 (e.g., to perform parallel object identification across multiple instances of object identification).

Additionally or alternatively, one or more object detection models 140 can be included in or otherwise stored and implemented by the server computing system 130 that communicates with the user computing device 102 according to a client-server relationship. For example, the object detection models 140 can be implemented by the server computing system 140 as a portion of a web service (e.g., an object identification service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more object detection models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2 and 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the object detection models 120 and/or 140 based on a set of training data 162. The training data 162 can include, for example, input images that have been labelled as containing a desired object or not containing the desired object.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 2B depicts a block diagram of an example computing device 10 that performs object recognition according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
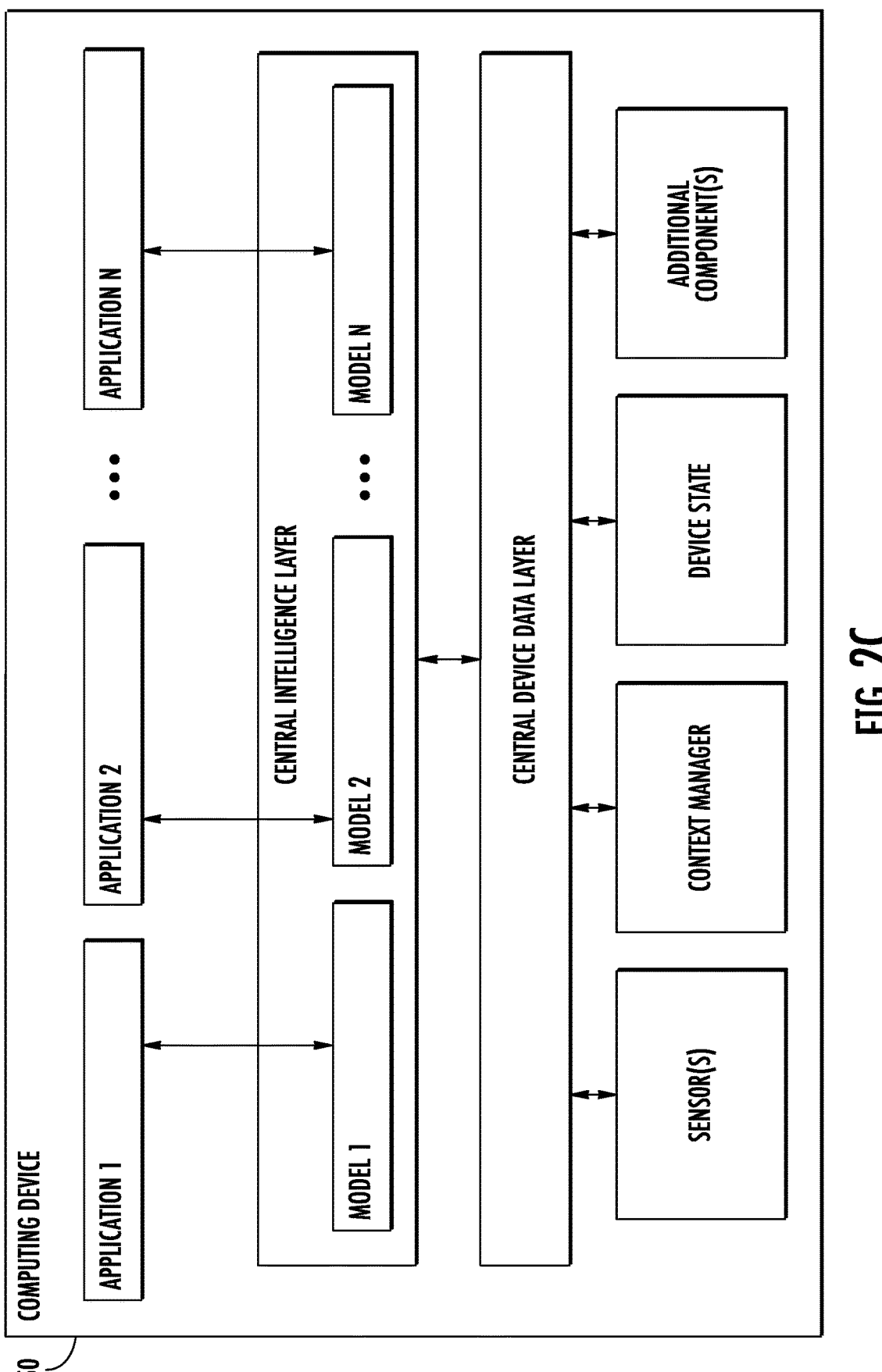
FIG. 2C depicts a block diagram of an example computing device that performs object identification according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for detecting an object in an image, the method comprising:

receiving, by a computing system comprising at least one electronic processor, an input image;

generating, by the computing system, an image set from the input image, wherein the image set comprises a plurality of images that depict different portions of the input image, at least one of the plurality of images being a cropped image generated based on cropping the input image to depict a cropped portion of the input image;

respectively processing, by the computing system, the plurality of images with a plurality of machine-learned models to generate a plurality of outputs respectively from the plurality of machine-learned models, the cropped image being processed by a first machine-learned model of the plurality of machine-learned models and at least one other image of the plurality of images being processed by a second machine-learned model of the plurality of machine-learned models;

determining, by the computing system, an object detection prediction for the input image based at least in part on the plurality of outputs respectively from the plurality of machine-learned models; and performing, by the computing system, at least one action based at least in part on the object detection prediction for the input image.

2. The method of claim 1, wherein:

the input image depicts a person;

the plurality of images of the image set comprise:

a head image that depicts both a head of the person and a background area that surrounds the head of the person; and a face image that has been cropped to depict only a face of the person; and the plurality of machine-learned models comprise:

a machine-learned head model configured to process the head image to generate a head output indicative of whether the input image comprises a particular object; and a machine-learned face model configured to process the face image to generate a face output indicative of whether the input image comprises the particular object.

3. The method of claim 1, wherein:

the input image depicts a person;

the plurality of images of the image set comprise:

a head image that depicts both a head of the person and a background area that surrounds the head of the person; and one or more image patches that have been cropped to depict only one or more subsets of a face of the person; and the plurality of machine-learned models comprise:

a machine-learned head model configured to process the head image to generate a head output indicative of whether the input image comprises a particular object; and a machine-learned patch model configured to process the one or more image patches to generate one or more patch outputs indicative of whether the input image comprises the particular object.

4. The method of claim 1, wherein:

the input image depicts a person;

the plurality of images of the image set comprise:

a face image that has been cropped to depict only a face of the person; and one or more image patches that have been cropped to depict only one or more subsets of the face of the person; and the plurality of machine-learned models comprise:

a machine-learned face model configured to process the face image to generate a face output indicative of whether the input image comprises a particular object; and a machine-learned patch model configured to process the one or more image patches to generate one or more patch outputs indicative of whether the input image comprises the particular object.

5. The method of claim 1, wherein:

the input image depicts a person;

the plurality of images of the image set comprise:

a head image that depicts both a head of the person and a background area that surrounds the head of the person;

a face image that has been cropped to depict only a face of the person; and one or more image patches that have been cropped to depict only one or more subsets of the face of the person; and the plurality of machine-learned models comprise:

a machine-learned head model configured to process the head image to generate a head output indicative of whether the input image comprises a particular object;

a machine-learned face model configured to process the face image to generate a face output indicative of whether the input image comprises the particular object; and a machine-learned patch model configured to process the one or more image patches to generate one or more patch outputs indicative of whether the input image comprises the particular object.

6. The method of claim 1, wherein the plurality of machine-learned models comprise:

a machine-learned pixel-wise model configured to process at least a portion of the input image to generate a grayscale image that indicates a prediction on a pixel-wise basis.

7. The method of claim 1, wherein:

the plurality of outputs respectively from the plurality of machine-learned models comprise a plurality of probabilities each indicating a probability that the input imagery comprises the particular object; and determining, by the computing system, the object detection prediction for the input image based at least in part on the plurality of outputs comprises determining, by the computing system, a weighted average of the plurality of probabilities.

8. The method of claim 1, wherein the plurality of machine-learned models have been trained independently of each other.

9. The method of any of claim 1, wherein:

the plurality of outputs respectively from the plurality of machine-learned models comprise a plurality of embeddings respectively output by the plurality of machine-learned models; and determining, by the computing system, the object detection prediction for the input image based at least in part on the plurality of outputs comprises processing, by the computing system, the plurality of embeddings with a machine-learned classification model to generate the object detection prediction as an output of the machine-learned classification model.

10. The method of any of claim 1, wherein the plurality of machine-learned models have been jointly trained with each other in an end-to-end fashion.

11. The method of claim 1, wherein generating, by the computing system, the image set from the input image comprises:

performing, by the computing system, one or more cropping operations on the input image to generate a plurality of cropped images that depict different portions of the input image; and performing, by the computing system, one or more scaling operations on the plurality of cropped images to generate the plurality of images of the image set.

12. The method of claim 1, wherein:

the input image depicts a person; and performing, by the computing system, the at least one action based at least in part on the object detection prediction for the input image comprises determining, by the computing system, whether to authenticate the person as an authenticated user based at least in part on the object detection prediction.

13. The method of claim 1, wherein the plurality of images included in the image set comprise images having different image scales.

14. A computer system for detecting an object, the computer system comprising:

at least one electronic processor;

one or more non-transitory computer-readable media that collectively store:

a multi-scale model ensemble comprising a plurality of machine-learned models; and instructions that, when executed by the computing system, cause the computer system to perform operations, the operations comprising:

receiving an input image;

generating an image set from the input image, wherein the image set comprises a plurality of images that depict different portions of the input image, at least one of the plurality of images being a cropped image generated based on cropping the input image to depict a cropped portion of the input image;

respectively processing the plurality of images with the plurality of machine-learned models to generate a plurality of outputs respectively from the plurality of machine-learned models, the cropped image being processed by a first machine-learned model of the plurality of machine-learned models and at least one other image of the plurality of images being processed by a second machine-learned model of the plurality of machine-learned models;

determining an object detection prediction for the input image based at least in part on the plurality of outputs respectively from the plurality of machine-learned models; and performing at least one action based at least in part on the object detection prediction for the input image.

15. The computer system of claim 14, wherein:

the input image depicts a person;

the plurality of images of the image set comprise two or more of:

a head image that depicts both a head of the person and a background area that surrounds the head of the person;

a face image that has been cropped to depict only a face of the person; and one or more image patches that have been cropped to depict only one or more subsets of the face of the person; and the plurality of machine-learned models comprise two or more of:

a machine-learned head model configured to process the head image to generate a head output indicative of whether the input image comprises a particular object;

a machine-learned face model configured to process the face image to generate a face output indicative of whether the input image comprises the particular object; and a machine-learned patch model configured to process the one or more image patches to generate one or more patch outputs indicative of whether the input image comprises the particular object.

16. The computer system of claim 14, wherein the plurality of machine-learned models comprise:

a machine-learned pixel-wise model configured to process at least a portion of the input image to generate a grayscale image that indicates a prediction on a pixel-wise basis.

17. The computer system of claim 14, wherein:

the plurality of outputs respectively from the plurality of machine-learned models comprise a plurality of probabilities each indicating a probability that the input imagery comprises the particular object; and determining the object detection prediction for the input image based at least in part on the plurality of outputs comprises determining a weighted average of the plurality of probabilities.

18. The computer system of claim 14, wherein:

the plurality of outputs respectively from the plurality of machine-learned models comprise a plurality of embeddings respectively output by the plurality of machine-learned models; and determining the object detection prediction for the input image based at least in part on the plurality of outputs comprises processing the plurality of embeddings with a machine-learned classification model to generate the object detection prediction as an output of the machine-learned classification model.

19. A user device for detecting an object, the user device comprising:

at least one electronic processor;

one or more non-transitory computer-readable media that collectively store:

a multi-scale model ensemble comprising a plurality of machine-learned models; and instructions that, when executed by the computing system cause the computer system to perform operations, the operations comprising:

receiving an input image;

generating an image set from the input image, wherein the image set comprises a plurality of images that depict different portions of the input image, at least one of the plurality of images being a cropped image generated based on cropping the input image to depict a cropped portion of the input image; and respectively processing the plurality of images with the plurality of machine-learned models to generate a plurality of outputs respectively from the plurality of machine-learned models, the cropped image being processed by a first machine-learned model of the plurality of machine-learned models and at least one other image of the plurality of images being processed by a second machine-learned model of the plurality of machine-learned models;

determining an object detection prediction for the input image based at least in part on the plurality of outputs respectively from the plurality of machine-learned models; and performing at least one action based at least in part on the object detection prediction for the input image.

20. The user device of claim 19, wherein:

the input image depicts a person;

the plurality of images of the image set comprise two or more of:

a head image that depicts both a head of the person and a background area that surrounds the head of the person;

a face image that has been cropped to depict only a face of the person; and one or more image patches that have been cropped to depict only one or more subsets of the face of the person; and the plurality of machine-learned models comprise two or more of:

a machine-learned head model configured to process the head image to generate a head output indicative of whether the input image comprises a particular object;

a machine-learned face model configured to process the face image to generate a face output indicative of whether the input image comprises the particular object; and a machine-learned patch model configured to process the one or more image patches to generate one or more patch outputs indicative of whether the input image comprises the particular object.

* * * * *